United States Patent [19]
Gross

[11] Patent Number: 5,420,783
[45] Date of Patent: May 30, 1995

[54] CONTROL LOGIC POWER DOWN CIRCUIT

[75] Inventor: Lawrence W. Gross, Boca Raton, Fla.

[73] Assignee: Boca Systems, Inc., Boca Raton, Fla.

[21] Appl. No.: 218,615

[22] Filed: Mar. 25, 1994

[51] Int. Cl.$^6$ .............................. G05F 1/40; H02J 7/00
[52] U.S. Cl. ........................................ 323/268; 307/64
[58] Field of Search ............... 323/224, 225, 268, 270; 307/33, 34, 64; 361/18, 63, 65

[56] References Cited

U.S. PATENT DOCUMENTS

| | | | |
|---|---|---|---|
| 4,492,876 | 1/1985 | Colbert et al. | 307/66 |
| 4,698,738 | 10/1987 | Miller et al. | 323/268 |
| 5,191,229 | 3/1993 | Davis et al. | 307/64 |
| 5,216,286 | 6/1993 | Peterson | 307/64 |

Primary Examiner—Thomas M. Dougherty
Assistant Examiner—Matthew V. Nguyen
Attorney, Agent, or Firm—John C. Smith

[57] ABSTRACT

A secondary low voltage regulator for systems having low voltage control logic and high voltage devices susceptible to thermal damage due to loss of control logic power. When a power failure interrupts the primary power supply for the control logic, the secondary regulator uses the falling high voltage normally supplied to the high voltage devices as an input to a secondary regulator which supplies power to the control logic. The control logic remains active until the falling high voltage reaches a low level where the high voltage devices will not be heat damaged if not controlled by the control logic circuitry.

17 Claims, 9 Drawing Sheets

CONTROL LOGIC POWER DOWN CIRCUIT

BACKGROUND OF THE INVENTION

1. Technical Field

The present invention relates to logic circuits. In particular, it relates to secondary power circuits for logic which controls thermal or high voltage devices such as thermal printers.

2. Background Art

The development of computers and computerized printing has allowed many new useful applications to become both inexpensive and commonly available. Typical applications include the use of printers to print tickets on demand for theater performances, receipts for store purchases, etc.

Thermal printers not only provide a low cost solution to on demand printing, but they also provide flexibility in the print content. For example, in addition to alphanumeric data which can be printed in a variety of fonts, data such as bar codes and other symbols can also be printed on the ticket with the alphanumeric data.

To print images, high voltage devices such as thermal printer print heads heat a small point on the paper to create a darkened spot (i.e., pixel). An important factor in any printer is print quality. To increase the dots per inch (DPI) print density, and thereby provide increased image quality, the development of thermal print heads has led to progressively smaller heating elements which in turn allows increased print density. Of course, reducing the size of the heating elements also makes them more delicate and susceptible to damage. Likewise, the same can be said for dot matrix printers which have achieved improved print density through ever smaller and more delicate impact wires.

A second factor which has been an important concern in the development of printers is speed. In the case of thermal printers, improvements in overall print throughput are directly limited by the speed at which the heating elements in the print head heat up or cool down. Therefore, a principle area of improvement in thermal printer speed has been the development of heating element materials which have a high heating/cooling rate. By providing the capacity to generate heat quickly and to dissipate heat quickly, paper can be moved through the printer at a faster rate without degrading print quality.

The simultaneous development of these two factors has resulted in high speed, high quality printers which can be constructed as a compact printer for local use by mainframe computer systems, personal computers, and other business machines such as cash registers.

In addition to the traditional uses discussed above, thermal printers have also found extensive use in other fields, such as facsimile (fax) machines. In the area of fax machines, the speed of the printer is a limiting factor in that it must be able to print at a faster rate than the telecommunications circuitry can send or receive. If not, either data will be lost, or the fax buffer will fill and the transmission will slow down to the speed of the printer. This results in additional carrier charges due to the additional time taken to complete the transmission. Likewise, print quality is also a concern with fax machines. Therefore, the issues and concerns of applications such as fax transmission are substantially the same as those related to traditional printers.

As improvements have been made in the areas of speed and print density, machines have been developed with increasingly finer and more delicate heating elements which, at the same time, are able to heat up and cool down at increasingly rapid rates. As a result of these advances, high voltage devices such as thermal printers are susceptible to thermal damage in power loss situations. The high voltage print heads are typically controlled by low voltage control logic. When power is lost, both the high and low voltage systems drop at a rate governed by the particular components. Typically, a consequence of power loss is that the low voltage control logic is deactivated first due to the earlier reduction of low voltage power to a level where the control logic fails. After the control logic has failed, the high voltage (while partially reduced) is still at a level where active heating elements can continue to heat. Any elements which were being actively heated at the moment of control logic failure will not be shut off by the control logic. Due to the high heating rates of these devices, the extended heating time allows those heating elements to continue to generate heat until they are damaged.

The prior art has not provided the means to extend the amount of time available to control logic in power down situations to effectively control high voltage devices until the high voltage has dropped to a point where it no longer endangers components.

SUMMARY OF THE INVENTION

The present invention solves the foregoing problems by providing a secondary voltage regulator which uses the falling high voltage as a source of power to provide low voltage power to control logic during a power drop. When primary low voltage power to the control logic's primary low voltage regulator drops, a sensor generates a power down signal which enables the secondary low voltage regulator to provide low voltage power to the control logic. The secondary low voltage regulator maintains low voltage power to the control logic while the high voltage decays to a level below the point where thermal damage to high voltage devices is likely.

DESCRIPTION OF THE PREFERRED EMBODIMENT

For the purposes of this disclosure, the term "high voltage" is defined as any voltage greater than the voltage used for the logic circuits. In the preferred embodiment, the logic circuits are powered at a 5 volt level. However, 3.3 volt logic, or any other suitable logic voltage level can be used as the "logic voltage".

Prior to discussion of the invention, a discussion of the prior art follows to better illustrate the effects and advantages of the invention.

Figure 1:
FIG. 1 is a diagram of a correctly printed sample ticket.

In FIG. 1, a correctly printed sample ticket is shown to illustrate the types of data which might be desirable to print on a ticket. Alphanumeric information, which the individual holder would want and a ticket taker in a location such as a theater would require, can be placed on the ticket in any convenient location. In addition to alphanumeric data, it is often desirable to have machine readable information such as bars codes on a ticket. For example, parimutuel wagering systems such as a racetrack operation, lottery ticket vending machines, train or bus ticket readers, etc. allow ticket takers to service customers much more rapidly than can be done by manually reading the ticket. Likewise, bar codes allow other products, such as discount coupons, to be printed at a cash register while a customer purchases an item. As can be seen, the amount of information will vary widely depending on the application.

Figure 2:
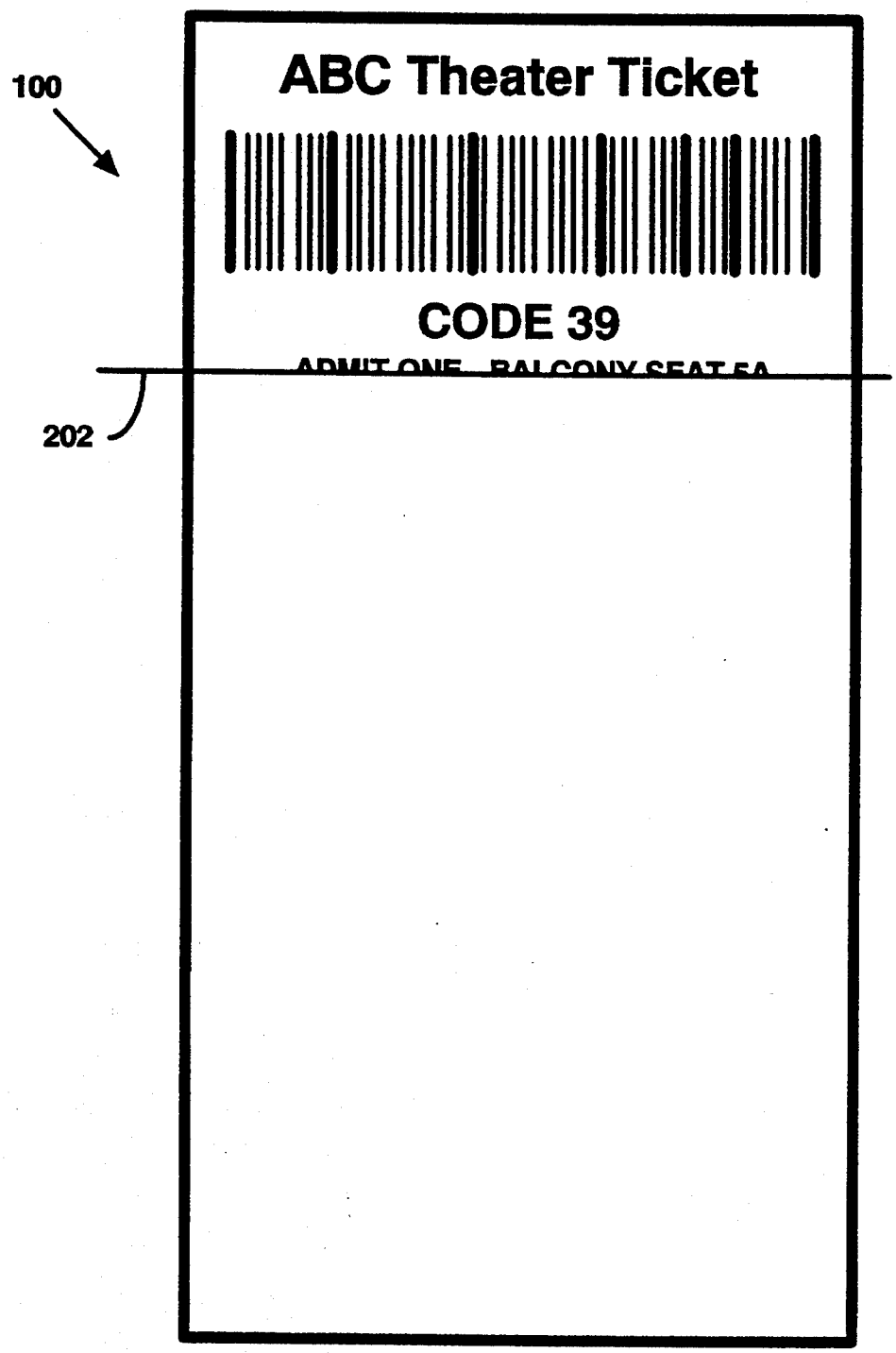
FIG. 2 is a prior art diagram showing the result of a power failure while printing a sample ticket.

FIG. 2 is a prior art illustration showing a ticket which was partially through the printing process when a power drop occurred. Line 202 is drawn over the ticket to illustrate the point of power failure. At this point, any high voltage device 810 (heating elements shown below in FIG. 8) which was in the off state will remain off, and therefore, sustain no thermal damage. On the other hand, those high voltage devices 810 which were on at the point of power failure will no longer be controlled by the control logic 806 (shown in FIG. 8). Therefore, they will remain on for an extended period of time. The accumulated heat can burn out these high voltage devices 810 which in turn creates blank areas on future tickets (illustrated below). High voltage devices 810, as used in thermal printers, are typically thin film or thick film resistive devices. The high voltage devices discussed herein, such as thermal print heads, typically use relatively high current levels when active. Both the control logic 806 and the high voltage devices 810 used by thermal printers are well known in the art and require no additional explanation herein.

Figure 3:
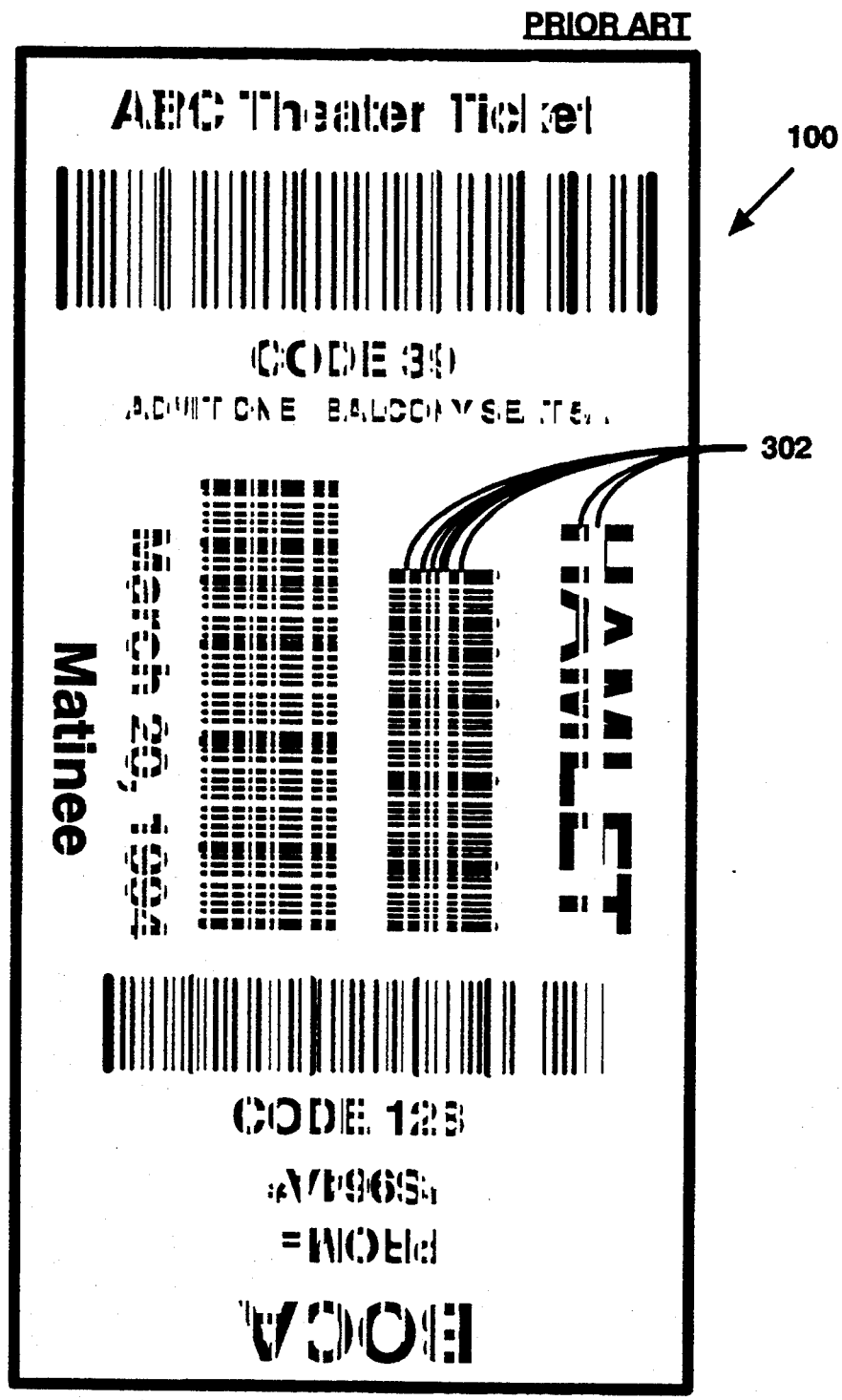
FIG. 3 is a prior art diagram showing the effect of damage to the thermal print heads on tickets printed after the power failure illustrated in FIG. 2.

FIG. 3 is a prior art illustration showing the effect on subsequently printed tickets by the thermal damage discussed in FIG. 2. The burned out high voltage devices 810 result in blank stripes 302 which degrade print quality. While a significant inconvenience for human readers, the tickets may still be decipherable. However, in situations where machines are used to read bar codes or similar information, the result can be disastrous. By failing to print one or more stripes in a bar code, the ticket may be useless.

Figure 4:
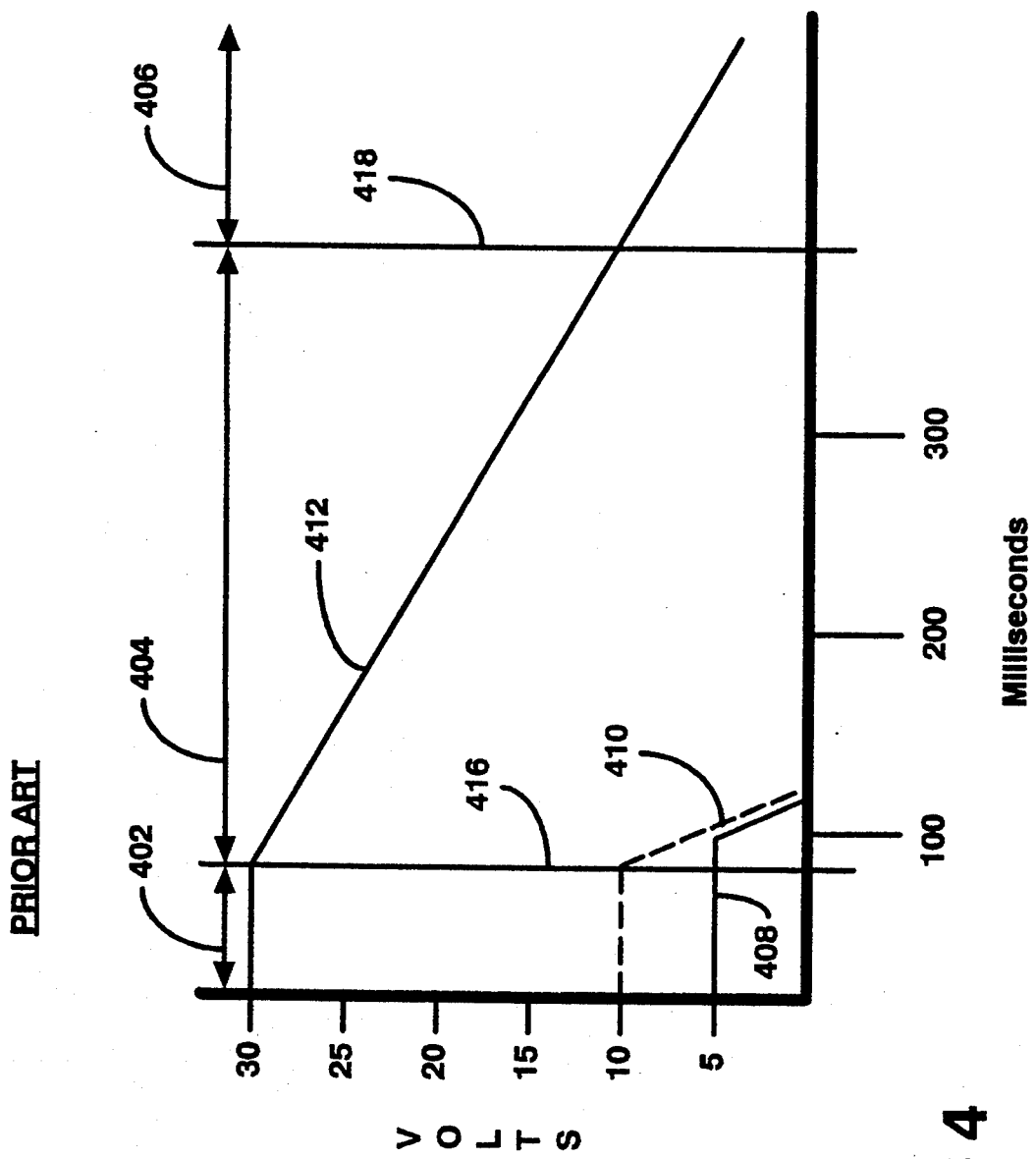
FIG. 4 is a prior art voltage/timing diagram illustrating the sequence of events during a power failure.

FIG. 4 is a prior art voltage/time diagram which shows why the damage illustrated in FIGS. 2 and 3 occurs. Line 408 represents the regulated low voltage supplied to control logic 806. Line 410 represents the unregulated low voltage supplied to the primary low voltage regulator 804 (shown in FIG. 8). Line 412 represents the high voltage supplied to the high voltage devices 810.

Time period 402 represents normal operation. Vertical line 416 indicates the point in time that a power failure occurs. At this point, the high voltage 412 and the unregulated low voltage 410 begin to drop. Shortly thereafter, the regulated low voltage 408 also begins to drop. Control logic 806, which is powered by regulated low voltage 408 will fail at the point where the regulated low voltage 408 is insufficient to maintain circuit operation, at approximately 100 milliseconds as displayed on the diagram.

In a typical 5 volt system, logic failure will occur at approximately 4.5 volts. However, damage to high voltage components can occur at high voltage levels approximately 10 volts or higher. As can be seen in FIG. 4, control logic 806 fails at the outset of time period 404. During substantially all of time period 404, the low voltage regulator has failed, causing the control logic 806 to fail. During this period, high voltage 412 is slowly decaying from 30 to 10 volts. Due to the failure of control logic 806 before high voltage 412 subsides, the high voltage devices 810 are not turned off, resulting in thermal damage. As a result of the damage, business operations are disrupted, and the expense of unnecessary repairs is incurred.

Time period 406, beginning at vertical line 418, illustrates the period in which the high voltage 412 has decreased to the point where thermal damage due to high current levels is not a significant concern.

Figure 5:
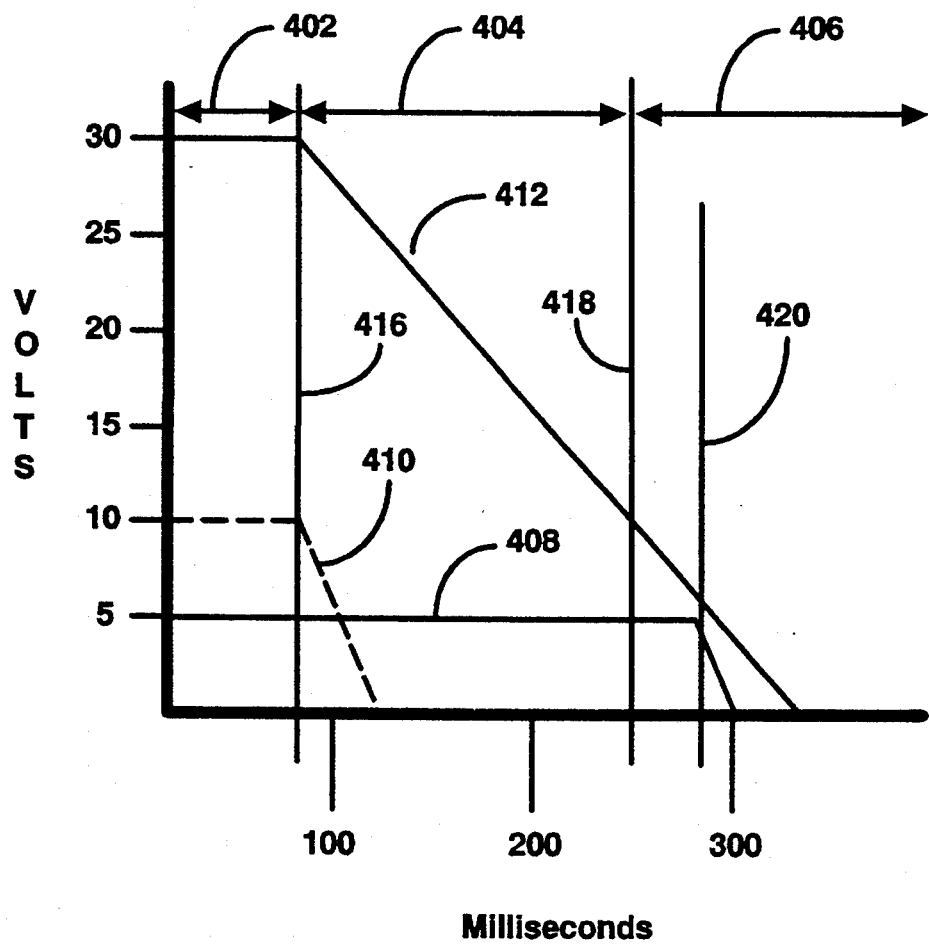
FIG. 5 is a voltage/timing diagram illustrating the sequence of events during a power failure with the present invention.

FIG. 5 is a voltage/time diagram illustrating voltage levels in the preferred embodiment. Unregulated low voltage 410 and high voltage 412 fall in the same manner as shown in the prior art diagram of FIG. 4. However, in this embodiment, regulated low voltage 408 is maintained during time period 404. In turn, high voltage devices 810 are controlled by control logic 806 to prevent excessively long periods of high current during power drop which can cause thermal damage.

This is possible because a secondary low voltage regulator 808 (shown in FIG. 8) is activated at power loss time. Secondary regulator 808 uses high voltage 412 as its source of power. By so doing, secondary low voltage regulator 808 can provide power to control logic 806 to the time indicated by line 420. After high voltage 412 drops to a level, indicated by vertical line 418, where it can no longer produce thermal damage, it continues to supply voltage to secondary low voltage regulator 808 which continues to power control logic 806 until it begins to fail at line 420, well below the high voltage 412 level where thermal damage can occur. Those skilled in the art will recognize that variance in timing patterns will be occasioned by design choices and variances in component values. Therefore, both the timing values and the voltage levels discussed herein are for illustrative purposes only.

An additional benefit of secondary low voltage regulator 808 is that by using high voltage 412 as its power source, it acts as a current drain which accelerates the decay rate of high voltage 412. Therefore, a reduction in time that the high voltage 412 remains active during power down is achieved. This acceleration is reflected in the differing decay slopes shown in FIGS. 4 and 5.

Figure 6:
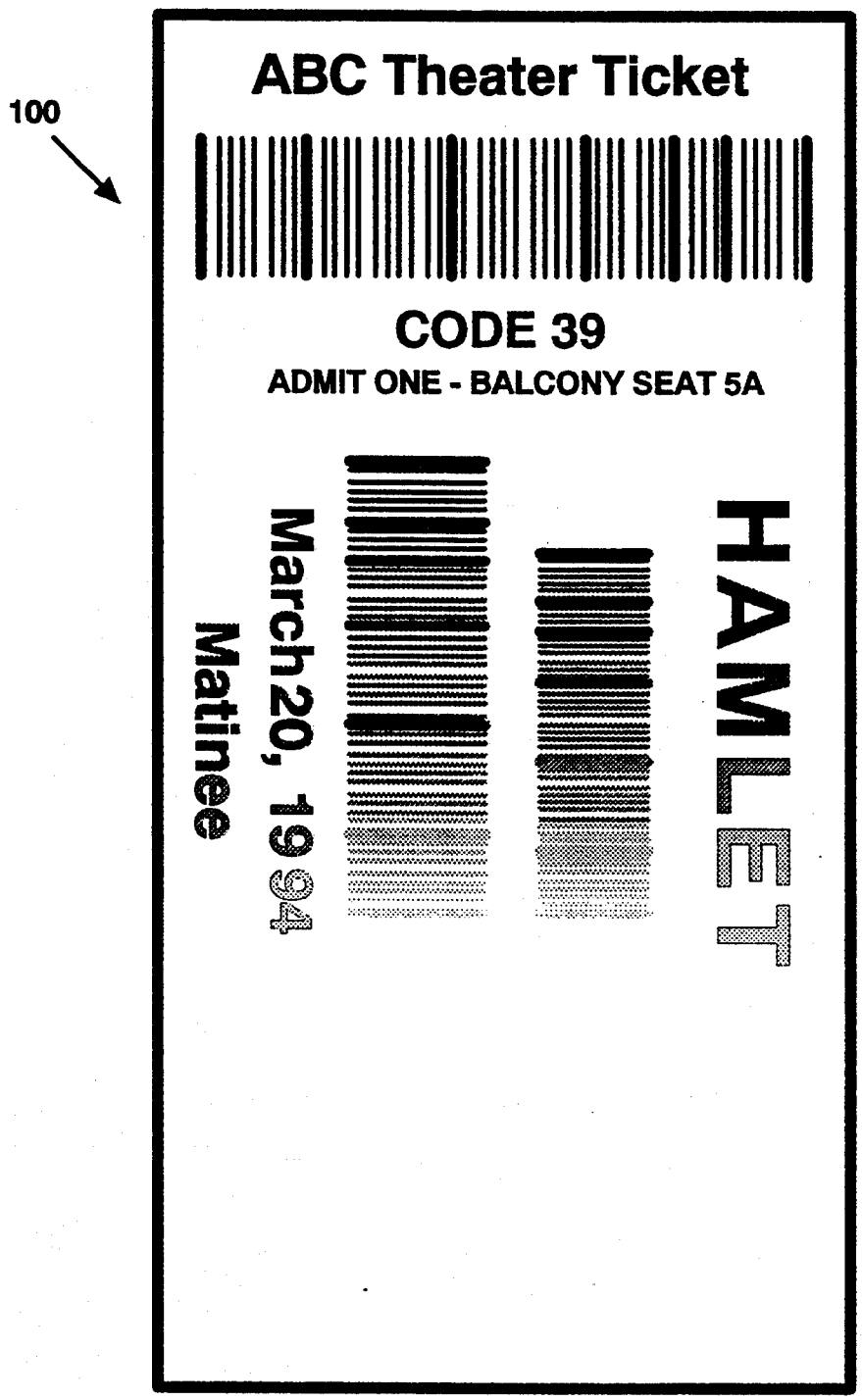
FIG. 6 is a diagram showing the result of a power failure while printing a sample ticket with the present invention.

FIG. 6 shows the effect on a ticket 100 of extending the time that power is available to control logic 806 during power drop. The gradual fading illustrated is a result of the gradual decline in high voltage 412 while control logic 806 remains operative. By remaining active, control logic 808 continues to switch high voltage devices 810 on and off in normal fashion, thereby preventing excessive heat buildup and thermal damage.

Figure 7:
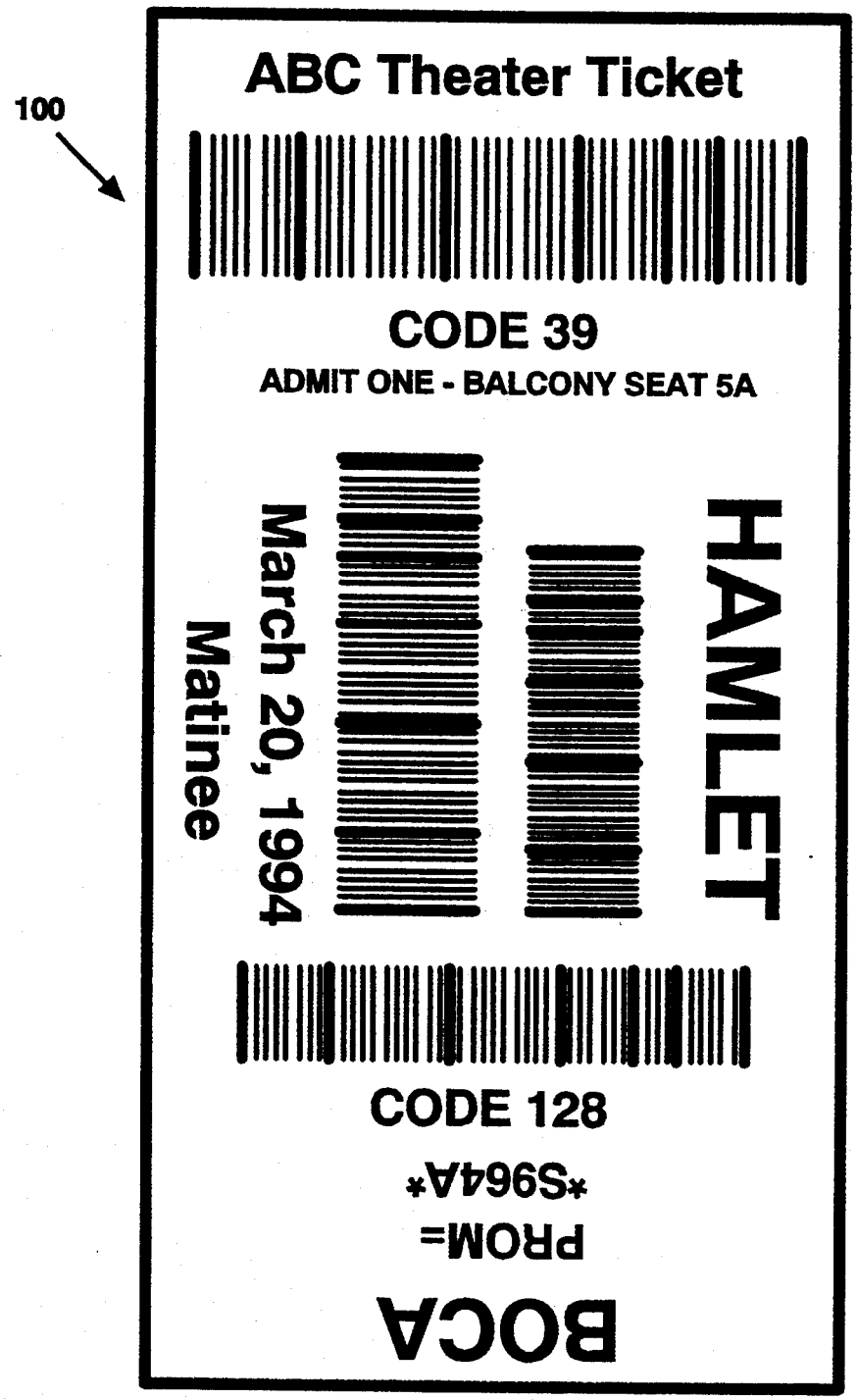
FIG. 7 is a diagram showing tickets printed after the power failure illustrated in FIG. 6

FIG. 7 illustrates a ticket 100, showing no thermal damage effects, printed subsequent to the ticket 100 shown in FIG. 6.

Figure 8:
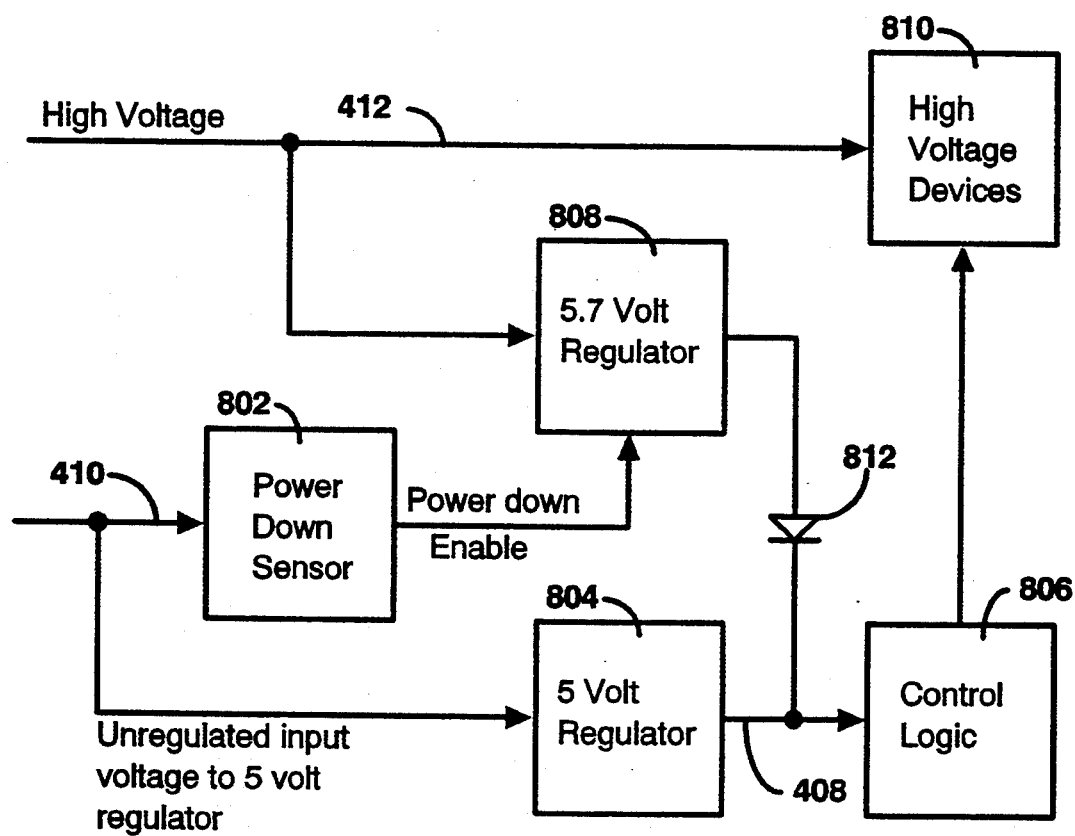
FIG. 8 is a block diagram illustrating the preferred embodiment of the circuit used to extend the control logic power as illustrated in FIG. 5.

FIG. 8 is a block diagram showing the preferred embodiment. In normal operation, unregulated low voltage 410 is input to voltage regulator 804. In turn, regulated low voltage power 408 is supplied to control logic 806. Control logic 806 controls the operation of high voltage devices 810.

In this embodiment, when power fails the circuit behaves as follows. A sensor 802 monitors the condition of unregulated low voltage 410. When a power drop is sensed, sensor 802 outputs a power down signal to enable secondary low voltage regulator 808. Secondary low voltage regulator 808 is supplied with power from the high voltage 412. Secondary low voltage regulator 808, when enabled by the power down signal from sensor 802, outputs regulated low voltage 408 through isolation diode 812 to control logic 806. Secondary low voltage regulator 808 continues to supply power to control logic 806 until the level of high voltage 412 declines to the point where secondary low voltage regulator 808 begins to fail. This will happen approximately at the point in time indicated by line 418 which is past the point where high voltage 412 can cause thermal damage.

Figure 9:
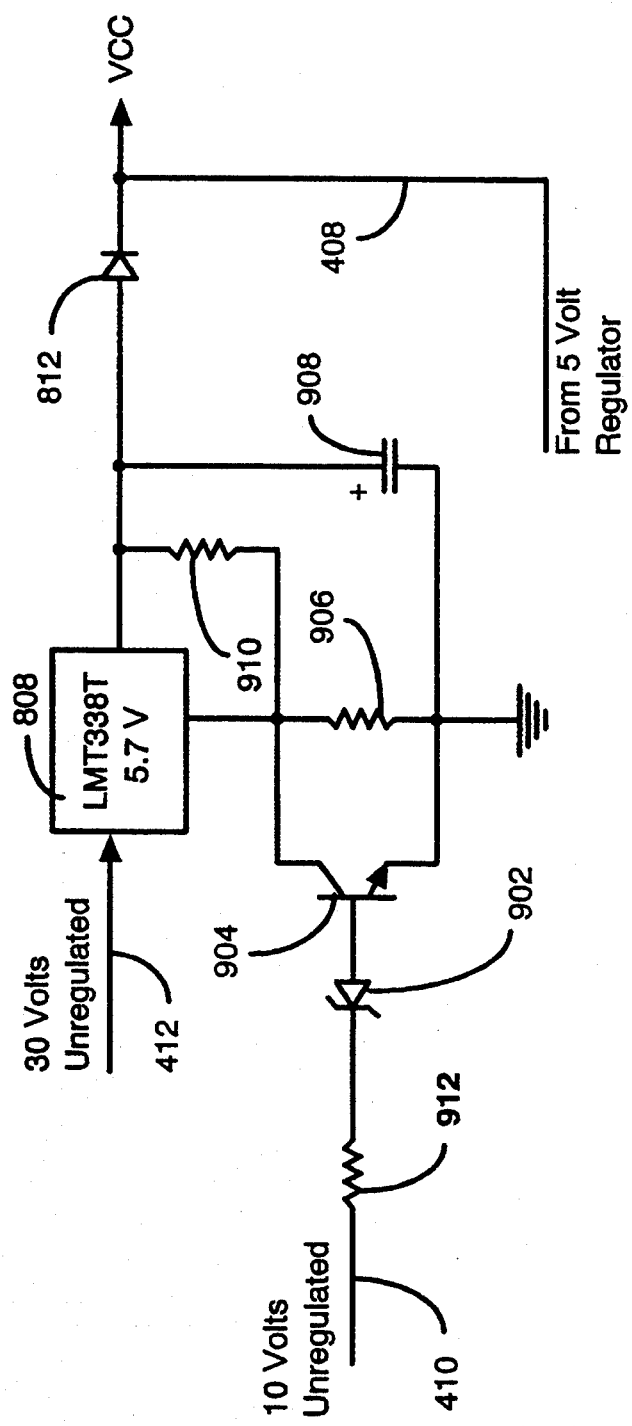
FIG. 9 is a detailed circuit diagram illustrating the preferred embodiment of the circuit used to extend the control logic power as illustrated in FIG. 5.

FIG. 9 is a detailed circuit diagram of the preferred embodiment shown in FIG. 8. Secondary low voltage regulator 808 is a type LMT338T, 5.7 volt regulator, sensor 802 implemented by diode 902, transistor 904, resistors 906, 910 and capacitor 908. Diode 902 is a type IN4737A, 7.5 volt diode, resistor 906 is 430 ohms, resistor 910 is 120 ohms, resistor 912 is 100 ohms, and capacitor 908 is 6.8 microfarads. Isolation diode 812 is a diode type IN4003. Those skilled in the art will recognize that while component values are supplied to fully illustrate the preferred embodiment, component values will change as a result of design choices. For example, while a five volt logic system is used in the preferred embodiment, the invention can just as easily be implemented on a 3.3 volt system. The time extension principles disclosed herein are not dependent on a particular technology platform, and can be easily adapted to alternative current or future technologies.

Those skilled in the art will recognize that the respective voltage levels shown are typically used for devices such as thermal printers. However, the principles of the invention may be applied to any type of device which uses multiple level power supplies and is susceptible to thermal damage caused by control logic failure during power loss situations. Likewise, voltage levels will vary with the particular type of circuit technology selected for an application. Therefore, the voltages and high voltage devices shown are for illustrative purposes only.

While the invention has been described with respect to a preferred embodiment thereof, it will be understood by those skilled in the art that various changes in detail may be made therein without departing from the spirit, scope, and teaching of the invention. For example, the type of high voltage device may vary from thermal printers, dot matrix printers, fax machines, or any other multi-voltage level machine susceptible to thermal damage during power down. Varying circuit architectures may be substituted, etc. Accordingly, the invention herein disclosed is to be limited only as specified in the following claims.

I claim:

1. A circuit for an apparatus having low voltage control logic and high voltage devices, comprising:
   at least one high voltage device;
   a high voltage power source connected to at least one high voltage device;
   control logic means connected the high voltage device to control current in the high voltage device;
   a low voltage power supply connected to the control logic means to provide primary power to the control logic means;
   power off sensing means to detect a power down condition, the power off sensing means having means to output a power down signal indicating loss of primary power to the control logic means; and
   a secondary low voltage regulator, the secondary low voltage regulator having a first input attached to the high voltage power source, a second input attached the output of the power off sensing means, and an output attached to the control logic means, the secondary low voltage regulator further having means to enable the secondary low voltage regulator when the power down signal is present, the secondary low voltage regulator, when enabled, providing low voltage power to the control logic means.

2. A circuit, as in claim 1, wherein the high voltage device is a print head.

3. A circuit, as in claim 2, wherein the high voltage device is a thermal print head.

4. A circuit, as in claim 2, wherein the high voltage device is a dot matrix print head.

5. A circuit, as in claim 1, wherein the secondary low voltage regulator acts as a current drain to accelerate the decay rate of the high voltage during power drop.

6. A circuit for an apparatus having multiple level power voltages, comprising:
   a primary low voltage power regulator, having an input for receiving low voltage power and an output for outputting regulated low voltage power;
   sensor means to detect the presence of low voltage power at the input to the primary low voltage power regulator, the sensor means further having an output providing a power down signal when the sensor means detects a power down condition;
   a secondary low voltage power regulator, the secondary low voltage power regulator having a first input for receiving high voltage power, and a second input connected to the output of the sensor means, the secondary low voltage power regulator further having means to convert high voltage power into low voltage regulated power when enabled by the power down signal, and an output to provide low voltage regulated power converted from the high voltage power; and
   power output means to connect the output of the primary low voltage power regulator and the output of the secondary low voltage power regulator such that low voltage power from the primary low voltage regulator will be output when low voltage power is present at the input to the primary low voltage regulator and low voltage power from the secondary low voltage regulator will be output when the power down signal enables the secondary low voltage regulator.

7. A circuit, as in claim 6, further comprising:
logic circuitry, the logic circuitry powered by low voltage output by the power output means;
a high voltage device, the high voltage device connected to and controlled by the logic circuitry.

8. A circuit, as in claim 7, wherein the high voltage device is a thermal print head.

9. A circuit, as in claim 7, wherein the high voltage device is a dot matrix print head.

10. A circuit, as in claim 6, wherein the secondary low voltage regulator acts as a current drain to accelerate the decay rate of the high voltage during power drop.

11. A method of extending the time in which low voltage control logic can control high voltage devices during power down, including the steps of:
providing low voltage to the input of a primary voltage regulator;
outputting regulated low voltage to the power input of the control logic;
sensing a power down by the absence of the voltage at the low voltage power input of the primary voltage regulator;
outputting a power down signal when the power down is sensed;
inputting high voltage from a high voltage power supply output to the input of a secondary voltage regulator;
enabling the secondary voltage regulator with the power down signal such that the secondary voltage regulator is enabled when the power down signal is active;
outputting regulated low voltage from the output of the secondary voltage regulator to the input of the control logic when the secondary voltage regulator is enabled.

12. A method, as in claim 11, including the step of controlling a high voltage device with the low voltage control logic during power down.

13. A method, as in claim 12, wherein the high voltage device is a thermal print head.

14. A method, as in claim 12, wherein the high voltage device is a dot matrix print head.

15. A method of increasing the rate of decay of high voltage power during power down, including the steps of:
sensing when power is dropping to a primary low voltage regulator;
activating a secondary low voltage regulator when the power drop is sensed;
current draining the high voltage by inputting high voltage from a high voltage power supply output to the input of a secondary low voltage regulator;
outputting regulated low voltage from the output of the secondary voltage regulator to the input of the control logic; and
controlling at least one high voltage device with the control logic while powered by the secondary voltage regulator.

16. A method, as in claim 15, wherein the high voltage device is a thermal print head.

17. A method, as in claim 15, wherein the high voltage device is a dot matrix print head.

* * * * *